May 17, 1927.

E. W. KNOWLTON 1,628,726

SAUSAGE STUFFER

Filed Aug. 10, 1925

2 Sheets-Sheet 1

Inventor,
Eugene W. Knowlton,
by Geyer & Geyer
Attorneys.

May 17, 1927.  E. W. KNOWLTON  1,628,726
SAUSAGE STUFFER
Filed Aug. 10, 1925    2 Sheets-Sheet 2
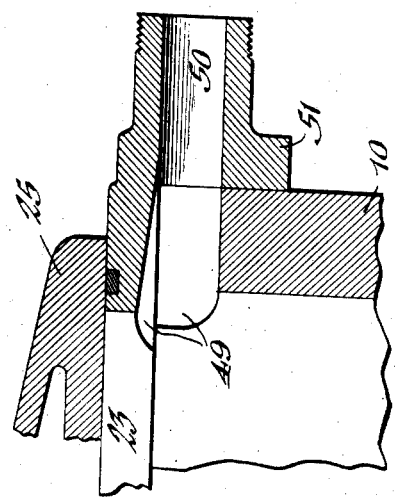
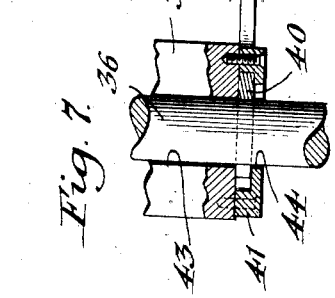
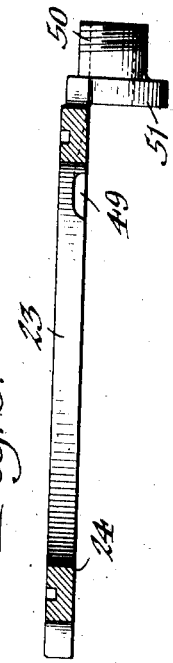
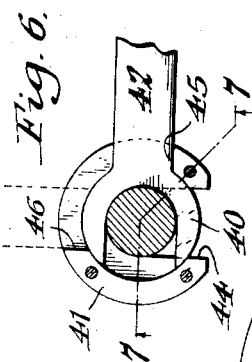
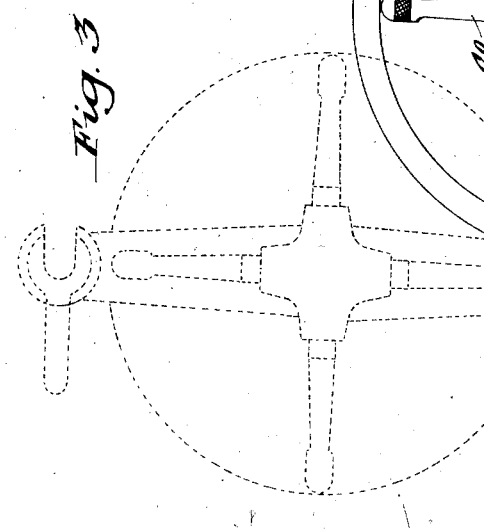
Inventor,
Eugene W. Knowlton,
by Geyer & Geyer
Attorneys.

Patented May 17, 1927.

1,628,726

UNITED STATES PATENT OFFICE.

EUGENE W. KNOWLTON, OF BUFFALO, NEW YORK, ASSIGNOR TO JOHN E. SMITH'S SONS COMPANY, OF BUFFALO, NEW YORK, A CORPORATION OF NEW YORK.

SAUSAGE STUFFER.

Application filed August 10, 1925. Serial No. 49,223.

This invention relates more particularly to the type of sausage stuffers comprising a cylinder having a laterally swinging cover or head, a free piston operated by compressed air or other fluid under pressure, and a so-called safety ring to prevent the piston from being blown out of the cylinder should the operator open the cylinder-cover before shutting off the fluid-pressure.

One object of the invention is to provide simple and reliable safety-means for largely relieving the walls of the cylinder from the tensile strain to which they are subjected, thus guarding against breakage of the cylinder.

A further object is to combine the meat-discharge openings or nozzles of the cylinder with the safety ring, in order to facilitate replacement of the nozzles, permit a lighter construction of the cover and easier operation thereof and avoid the necessity of disconnecting the sausage casings from the valved pipes screwed to the nozzles, before swinging the cover aside to load and clean the cylinder.

Another object is to improve the machine in other respects as will hereinafter appear.

Figure 2:
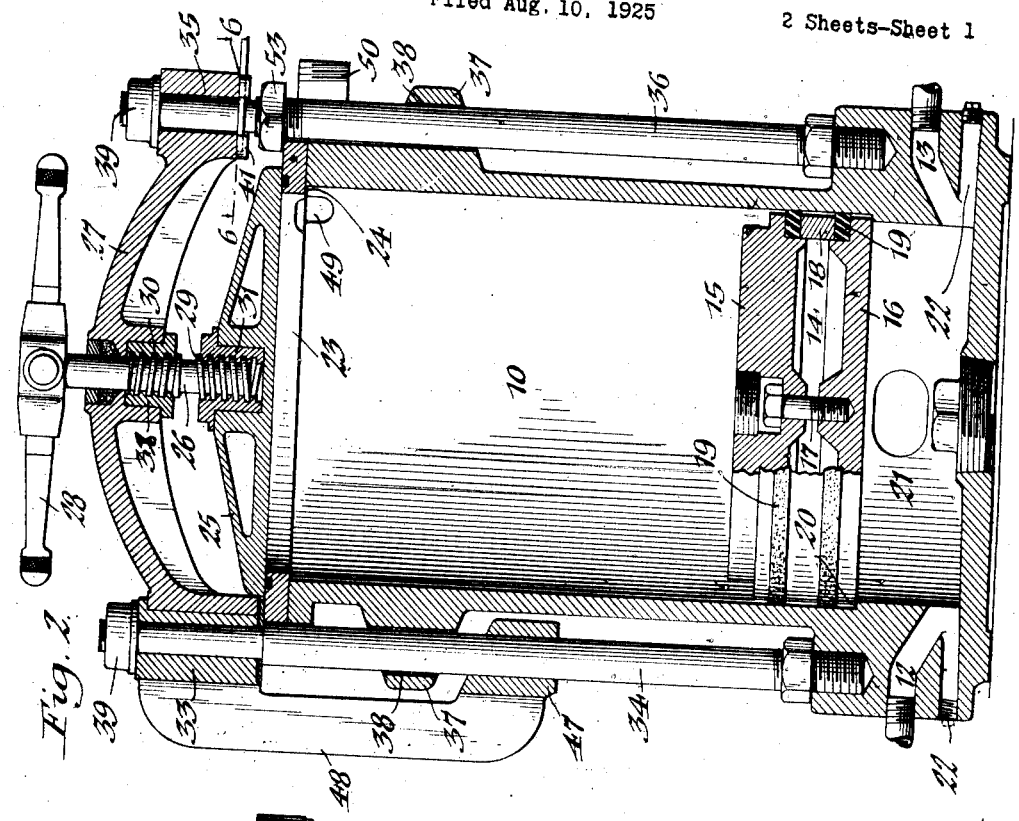
Figure 1:
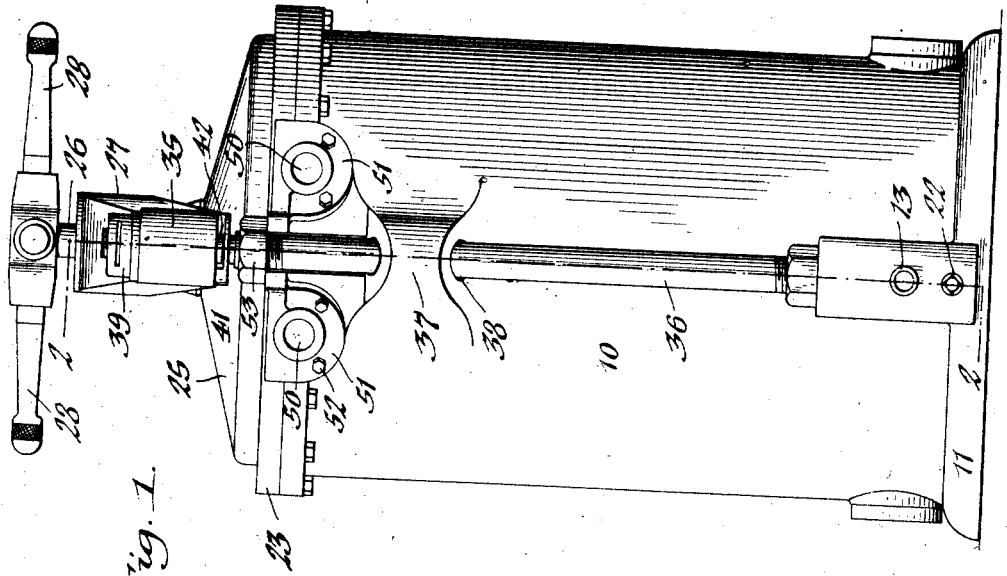

In the accompanying drawings: Figure 1 is a side elevation of the machine. Figure 2 is a vertical section thereof, on line 2—2, Fig. 1. Figure 3 is a top plan view of the same. Figure 4 is an enlarged vertical section of the upper portion of the cylinder, showing one of the meat-discharge nozzles. Figure 5 is a transverse section of the safety ring. Figure 6 is an enlarged horizontal section of the yoke-locking means on line 6—6, Fig. 2. Figure 7 is a vertical section on line 7—7, Fig. 6.

Similar reference characters indicate corresponding parts throughout the several views.

10 indicates the upright cylinder of the sausage stuffer closed at its lower end and preferably having a comparatively heavy base or projecting base-flange 11 containing an inlet 12 and an outlet 13 for the motive fluid, such as compressed air or water under pressure.

Operating in the cylinder is a piston 14 of any suitable construction which preferably consists of upper and lower metallic disks 15, 16, loosely connected together by a central bolt 17, an interposed metallic ring 18 and rubber packing rings or gaskets 19 arranged between said metallic ring and said disks, so that when the piston is moved upwardly by the air pressure, against the resistance of the sausage-meat in the cylinder, the upper and lower disks of the piston are forced toward each other, compressing the gaskets and expanding them against the walls of the cylinder and forming a tight joint.

At a short distance from its bottom, the cylinder is preferably provided with an interior stop shoulder 20 which limits the descent of the piston, leaving a space or chamber 21 in the bottom of the cylinder. This chamber allows the motive fluid to better start the piston on its upward stroke and also permits cleaning out of any material or juices that may in time work down past the piston. For this purpose, said chamber is provided with normally plugged flushing passages 22.

Securely bolted to the flanged upper end of the cylinder 10 is the safety ring 23 having a somewhat smaller bore than the cylinder to form a stop flange 24 which guards against blowing out of the piston in case the operator neglects to turn off the motive fluid before opening or removing the cover 25 which closes the open upper end of the cylinder. This cover, which is solid, is applied to the upper side of the safety ring against which it is clamped by an upright screw 26 carried by a yoke 27 extending across the top of the cylinder. This screw has arms 28 or other suitable means for turning it, and is preferably provided with right and left hand threads 29, 30, engaging correspondingly threaded bushings 31, 32, seated in sockets in the top of the cover and the bottom of the yoke, respectively. By this construction, the bushings can be readily renewed when worn out without disturbing or replacing the yoke.

The cylinder-cover 25 is preferably mounted to swing laterally relatively to the cylinder, and for this purpose, the yoke 27 is provided at one end with a hub or bearing 33 journaled on the projecting upper end of a fixed stay or safety rod 34 located at one side of the cylinder. At its other free end, the yoke has an open-sided head or enlargement 35 which embraces the projecting upper end of a similar rod 36 located at the opposite side of the cylinder. The lower ends of these safety-rods are firmly secured to the base flange 11 of the cylinder, while their upper portions pass through perforated lugs 37 projecting from opposite sides of the cylinder. The rods are secured in these lugs by babbitt 38 or other suitable material, thereby preventing them from springing or bending as the yoke with its load is swung upon one of the rods and stopped against the other. The ends of the yoke are held from the vertical displacement by nuts 39 applied to said rods. Any appropriate means may be used for retaining the free end of the yoke in its normal position. The preferred device consists of a rotary horizontal latch or locking plate 40 journaled in a housing 41 secured to the underside of the open-sided yoke-head and having a handle 42 for turning it, as shown in Figs. 2, 6 and 7. The open side of said yoke-head is in the form of a U-shaped recess 43 which is arranged to receive the safety-rod 36 and embrace it on the three sides when the yoke is swung into its normal position. The locking plate 40 has a corresponding U-shaped recess 44 which when turned into register with the recess of the yoke-head, as shown by dotted lines in Fig. 6, permits the yoke to be swung aside, while when the plate-recess is turned out of register with the yoke-recess, as shown by full lines in said figure, one wall of the plate recess extends across and closes the open end of the yoke-recess, locking the yoke to the safety-rod. To predetermine the locking and unlocking positions of the plate, its housing is provided in its walls with properly located stops 45, 46, for the handle of the plate, as shown in Fig. 6.

In order to effectually prevent sagging of the yoke when swung aside to its open, overhanging position, it is provided at its pivoted end with a supplemental hub or bearing 47 located a suitable distance below the upper hub 33, and connected therewith by a brace 48. The supplemental hub, like the main one, is journaled on the safety rod 34.

The safety rods, while forming supports for the yoke, practically tie the yoke and cover to the strong base or base flange 11 of the cylinder. The rods thus receive a large part of the stress exerted upon the yoke through the compressed meat and the cylinder cover 25, greatly relieving the cylinder-walls from the incidental tensile strain and guarding against their breakage and injury to attendants.

Arranged in the upper portion of the cylinder, preferably partly in its walls and partly in the adjoining portion of the safety ring, are one or more discharge openings 49 for the sausage meat. These openings lead to discharge nozzles 50, registering therewith and carried by depending ears or lugs 51, cast integral with the safety ring. These ears are secured by bolts 52 or other means to the sides of the cylinder. Screwed upon these nozzles are the usual valved pipes, not shown, to which the sausage casings are applied in the customary way.

To give further security to the safety ring midway of the nozzles 50, a clamping nut 53 is applied to the adjacent safety rod 36, in a position to overlap the safety ring at that point, as shown in Fig. 2.

In the use of the machine, assuming the motive fluid to be shut off from the cylinder 10 and the piston to have descended by gravity to its lowest position, the cylinder-cover 25 is unclamped from the safety ring 23 by properly turning the screw 26, and the yoke is unlocked from the safety rod 36 and swung aside to clear the cover of the cylinder. The latter is then filled with sausage meat or other desired material, the yoke is returned to its operative position and locked and the cover is tightly clamped down upon the safety ring to close the cylinder. The motive fluid being now turned on, it raises the piston and compresses the meat, expelling it through the nozzles 50 and stuffing the sausage casings in the usual manner.

Hitherto, these nozzles have been applied either to the cylinder or to its upper head or cover. By casting or otherwise applying them to the safety-ring instead of to the cylinder-cover, the latter is relieved of the weight of the nozzles and valved pipes, rendering it considerably lighter and enabling it to be swung more easily. When the nozzles and valved pipes are mounted on the cover there is the further objection that the sausage-casings must be detached from the pipes before swinging the cover aside, with the result that some of the meat remaining in the pipes, drops on the floor, rendering the machine unsanitary. This disadvantage is avoided by the present nozzles, which being mounted on the safety ring, permit the sausage casings to remain attached to the pipes in swinging the cover aside.

The screw threads of the nozzles are liable to be stripped in applying the valved pipes to them. Should this occur, the nozzles and the safety ring can be more easily replaced and at less expense than if the nozzles were cast on the cylinder or on the cover.

When the nozzles are cast on the cylinder, the meat cannot be fully expelled by the piston, because the latter will cover and close off the nozzles if it rises clear to the top of the cylinder; whereas, when the nozzles are part of the safety ring, the piston can make a full upward stroke and expel practically all of the cylinder-contents.

I claim as my invention:

1. A sausage stuffer, comprising a cylinder open at its upper end, a cover for said end, a piston in the cylinder, safety-rods rising from the base of the cylinder, a yoke carrying said cover and connected to the upper ends of said rods, said yoke being mounted to swing laterally on one of said rods and its pivotal end having upper and lower hubs journaled on the corresponding safety-rod, and a brace connecting said hubs.

2. A sausage stuffer, comprising a cylinder open at its upper end, a piston therein, a safety ring applied to the open end of the cylinder, a cover resting on said ring, safety-rods arranged at opposite sides of the cylinder, a yoke connected at its ends to said rods and carrying said cover and engaging said safety-ring.

3. A sausage stuffer, comprising a cylinder open at its upper end, a piston therein, a safety-ring applied to the open end of the cylinder, a cover resting on said ring, safety-rods arranged at opposite sides of the cylinder, a yoke connected at its ends to said rods and carrying said cover, and a clamping nut applied to one of said rods and overlapping said safety ring.

4. A sausage stuffer, comprising a cylinder open at its upper end, a piston therein, a safety ring applied to the open end of the cylinder, a cover for the cylinder, and a discharge nozzle mounted on the safety ring.

5. In a sausage-stuffer, a safety ring carrying a discharge nozzle.

6. A sausage-stuffer, comprising a cylinder provided in its upper portion with a discharge opening, and a safety ring carrying a discharge nozzle communicating with said opening.

7. A sausage stuffer, comprising a cylinder open at its upper end, a piston therein, a safety ring applied to the open end of the cylinder, a cover resting on said ring, safety-rods arranged at opposite sides of the cylinder, a yoke connected at its ends to said rods and carrying said cover, discharge nozzles carried by the safety ring and arranged on opposite sides of one of said safety-rods, and a clamping nut applied to the last-named rod and bearing upon the portion of said ring between said nozzles.

8. A sausage stuffer, comprising a cylinder provided at a distance from its lower end with an internal stop shoulder, and a piston in the cylinder above said stop shoulder, the cylinder being provided below said shoulder with a fluid inlet, a fluid outlet and flushing passages.

EUGENE W. KNOWLTON.